US011123920B2

(12) United States Patent
Lin et al.

(10) Patent No.: US 11,123,920 B2
(45) Date of Patent: Sep. 21, 2021

(54) 3D PRINTING APPARATUS AND METHOD

(71) Applicant: FUJIAN INSTITUTE OF RESEARCH ON THE STRUCTURE OF MATTER, CHINESE ACADEMY OF SCIENCE, Fuzhou (CN)

(72) Inventors: Wenxiong Lin, Fuzhou (CN); Huagang Liu, Fuzhou (CN); Jianhong Huang, Fuzhou (CN); Zhi Zhang, Fuzhou (CN); Zixiong Lin, Fuzhou (CN); Kaiming Ruan, Fuzhou (CN); Yan Ge, Fuzhou (CN); Haizhou Huang, Fuzhou (CN); Hongchun Wu, Fuzhou (CN); Jinhui Li, Fuzhou (CN); Wen Weng, Fuzhou (CN); Jinming Chen, Fuzhou (CN)

(73) Assignee: FUJIAN INSTITUTE OF RESEARCH ON THE STRUCTURE OF MATTER, CHINESE ACADEMY OF SCIENCE, Fuzhou (CN)

( * ) Notice: Subject to any disclaimer, the term of this patent is extended or adjusted under 35 U.S.C. 154(b) by 460 days.

(21) Appl. No.: 16/069,968

(22) PCT Filed: Jan. 13, 2016

(86) PCT No.: PCT/CN2016/070837
§ 371 (c)(1),
(2) Date: Jul. 13, 2018

(87) PCT Pub. No.: WO2017/120806
PCT Pub. Date: Jul. 20, 2017

(65) Prior Publication Data
US 2019/0009460 A1    Jan. 10, 2019

(51) Int. Cl.
*B29C 64/135* (2017.01)
*B33Y 30/00* (2015.01)
(Continued)

(52) U.S. Cl.
CPC .......... *B29C 64/135* (2017.08); *B29C 64/255* (2017.08); *B33Y 10/00* (2014.12); *B33Y 30/00* (2014.12)

(58) Field of Classification Search
None
See application file for complete search history.

(56) References Cited

U.S. PATENT DOCUMENTS

| 7,649,029 B2 | 1/2010 | Kolb et al. |
| 7,767,728 B2 | 8/2010 | Lu et al. |

(Continued)

FOREIGN PATENT DOCUMENTS

| CN | 102715751 A | 10/2012 |
| CN | 203254661 U | 10/2013 |

(Continued)

OTHER PUBLICATIONS

International Search Report dated Oct. 10, 2016 of corresponding International Application No. PCT/CN2016/070837; 6 pgs.

*Primary Examiner* — Michael P. Rodriguez
(74) *Attorney, Agent, or Firm* — Maier & Maier, PLLC

(57) ABSTRACT

A 3D printing apparatus with a radiation source, a workbench, and a liquid tank, wherein a workbench for supporting a three-dimensional object being constructed, and a liquid tank for containing a polymerizable liquid for constructing a three-dimensional object. The apparatus also includes a cover plate which is located in the liquid tank or on the top of the liquid tank; the radiation source irradiates from above the cover plate. The cover plate is an element transparent to the radiation source; and the lower surface of the cover plate is a covering surface which remains in contact with the polymerizable liquid during the printing process.

11 Claims, 2 Drawing Sheets

(51) Int. Cl.
*B33Y 10/00* (2015.01)
*B29C 64/255* (2017.01)

(56) References Cited

U.S. PATENT DOCUMENTS

| | | | |
|---|---|---|---|
| 7,935,476 B2 | 5/2011 | Teng | |
| 8,119,214 B2 | 2/2012 | Schwantes et al. | |
| 8,232,043 B2 | 7/2012 | Williamson et al. | |
| 2005/0248061 A1 | 11/2005 | Shkolnik et al. | |
| 2008/0113293 A1* | 5/2008 | Shkolnik | B29C 64/135 430/270.1 |
| 2015/0097315 A1* | 4/2015 | DeSimone | B33Y 50/02 264/401 |

FOREIGN PATENT DOCUMENTS

| | | |
|---|---|---|
| CN | 104527065 A | 4/2015 |
| CN | 104760291 A | 7/2015 |
| CN | 105122135 A | 12/2015 |
| CN | 205467381 U | 8/2016 |
| JP | 2012210408 A | 11/2012 |
| WO | 2012/129968 A1 | 10/2012 |

\* cited by examiner

3D PRINTING APPARATUS AND METHOD

FIELD

The present invention relates to the field of 3D printing, in particular to a 3D printing apparatus and the corresponding method.

BACKGROUND 3D printing (three-dimensional manufacturing) is a technology that constructs three-dimensional objects by means of layer-by-layer printing and layer-by-layer accumulating based on digital model files. In particular, a three-dimensional object is constructed by layer-by-layer curing of a photosensitive resin by irradiating visible light or ultraviolet light, which is commonly referred to as stereolithography (SLA). There are two known techniques to achieve SLA: one is that a newly added layer is located on the top surface of the object being constructed, called "top down" manufacturing technology; the other is that a newly added layer is located on the bottom surface of the object being constructed, called "bottom up" manufacturing technology.

For the "top down" technology, as disclosed in a Chinese patent application No. 201410795471.6 with a title of "a laser 3D printer with a scraping function and its light-curing printing method", at the beginning of the light-curing 3D printing process, the radiation source irradiates from top to bottom and then a newly added layer is formed on the upper surface of the object being constructed. Whenever a layer is formed, the object being constructed lowers one layer and submerges below the liquid level of the printing solution, i.e., in the printing unit, whenever the radiation unit scans and cures a layer, the scraping unit performs a scraping treatment on the upper surface of the layer, and then the printing unit is again lowered by a height of one layer, and continues to print the next layer until the printing is completed. That is, after the scraping unit performs a scraping operation and a slicking operation on the surface being constructed, the printing solution is recoated with one layer on the upper surface of the object being constructed, and then a new light irradiation and curing step is performed. The disadvantage of this "top down" three-dimensional manufacturing technique is that the objects being constructed have to submerge into the printing solution, and after each layer is formed, the irradiation has to stop so as to activate a complicated mechanical motion device to scrape the surface to reform a horizontal print solution coating, which complicates the apparatus and takes too much three-dimensional manufacturing time.

SUMMARY

It is an object of the present invention to provide a 3D printing apparatus and method that utilizes a "top down" irradiation of a radiation source and adopts an element transparent to the radiation source that completely or partially covers the polymerizable liquid to maintain a stable covering surface and carry out a new step of irradiation and curing without the need of scraping. Therefore, the defects of the traditional "top-down" three-dimensional manufacturing technology, such as the fluctuations in the liquid level, mechanical complexity, low speed, and incapability of continuous printing, are overcome.

The present invention is implemented by the following solutions:

The present invention provides to a 3D printing apparatus comprising a radiation source, a workbench, and a liquid tank, wherein a workbench for supporting a three-dimensional object being constructed, and a liquid tank for containing a polymerizable liquid for constructing a three-dimensional object, wherein the apparatus also includes a cover plate wherein the cover plate is located in the liquid tank or on the top of the liquid tank; the radiation source irradiates from above the cover plate which is an element transparent to the radiation source; and the lower surface of the cover plate is a covering surface which remains in contact with the polymerizable liquid during the printing process.

Further, the covering surface is fixed or substantially fixed during the printing process.

Further, when the cover plate is located on the top of the liquid tank, the cover plate and the liquid tank constitute a closed container or a container with an opening; when the cover plate is located in the liquid tank, the cover plate is fixed on the main structure or the liquid tank of the 3D printing apparatus wherein the liquid tank is a closed container or a container with an opening.

Further, the cover plate is a semipermeable element, thus the polymerization inhibitor can permeate onto the covering surface through the semipermeable element. Therefore, an inhibited curing layer is formed on the covering surface wherein the polymerization inhibitor is used to inhibit the curing of the polymerizable liquid, so as to ensure the non-destructive separation between the cured area and the covering surface during the printing process.

Further, the semipermeable element is a semipermeable polymer, porous glass, a nuclear pore membrane element, a microporous quartz crystal element, a microporous mica element, or combinations thereof.

Further, the semipermeable element has an oxygen permeability of no less than 10 bar.

Further, the inhibited curing layer should have a thickness of no less than 5 μm.

Further, the inhibited curing layer should also be maintained for a certain period of time, which is at least no less than the duration the curing process lasts.

Further, rigid support elements are provided outside or inside the semipermeable element for increasing the rigidity of the semipermeable element.

Further, the polymerization inhibitor permeates the semipermeable element naturally or under pressure.

Further, the covering surface of the cover plate uses materials or elements that are non-adhesive or less adhesive to the cured polymerizable liquid, so that the cured area and the covering plate are able to be separated non-destructively during the printing process.

Further, the non-adhesive or less adhesive materials or elements are selected from Teflon materials or elements, silicone materials or elements, polydimethylsiloxane materials or elements, poly-fluorinated ethylene propylene materials or elements, or combinations thereof.

Further, the polymerizable liquid contains free radical polymerizable resin and the corresponding curing inhibitor is air, pure oxygen and oxygen-enriched gas.

Further, when the cover plate and the liquid tank constitute a closed container, the apparatus further includes a liquid pump, a pressure detector and a control unit, wherein the pressure detector is used to detect the pressure change in the closed container, and wherein the control unit drives the liquid pump to pump the polymerizable liquid according to the pressure change detected by the pressure detector so as to maintain the pressure in the closed container.

Further, the apparatus also includes a motor and a control unit, wherein the motor drives the workbench to move up and down under the control of the control unit.

Further, sealing rings are provided where the liquid tank is fastened.

The present invention also provides a 3D printing method, which comprises the following steps:

(a) providing a workbench and a cover plate, wherein the cover plate is an element transparent to a radiation source with a covering surface, and a construction zone of a three-dimensional object is defined between the workbench and the covering surface, irradiation of the construction zone by the energy of the radiation source which permeates through the cover plate;

(b) filling the construction zone with a polymerizable liquid and keeping the polymerizable liquid in contact with the covering surface;

(c) irradiation of the construction zone by the energy of the radiation source which penetrates through the cover plate so as to form a cured area;

(d) moving the workbench downwards while keeping the covering surface stationary, so as to separate the cured area from the covering surface and form a subsequent construction zone between the cured area and the covering surface; then filling the subsequent construction zone with the polymerizable liquid and maintaining the polymerizable liquid in contact with the covering surface and the cured area;

(e) repeating steps (c) and (d) until the three-dimensional object is formed by layer-by-layer deposition;

wherein steps (c) and (d) are performed simultaneously or in order.

Further, the separation between the cured area and the covering surface in step (d) is a non-destructive separation.

Further, the 3D print method utilizes the 3D printing apparatus as previously disclosed.

According to the present invention, the inhibitor or polymerization inhibitor used in the present invention may be in liquid or gaseous form. In some embodiments, gas inhibitors are preferred. The specific inhibitor depends on the polymerized monomers and the polymerization reaction. For free radical polymerizable monomers, the inhibitor may conveniently be oxygen, which may be provided in the form of gas, such as air, oxygen-enriched gas (optionally, but in some embodiments, it is preferable to contain other inert gas to reduce their flammability), or in some embodiments, the inhibitor may be pure oxygen. In an alternative embodiment, for example the monomers are polymerized by a photoacid generator initiator, and the inhibitor may be alkalis such as ammonia, trace amines (for example methylamine, ethylamine, di- and trialkylamines such as dimethylamine, diethylamine, trimethylamine, triethylamine, etc.) or carbon dioxide, including their mixtures or combinations.

The beneficial effects of the present invention are as follows:

1. The present invention adopts a cover plate that is "transparent" to the radiation source and covers the polymerizable liquid. Since the polymerizable liquid is in complete or partial contact with the covering surface of the cover plate during printing. A three-dimensional object is constructed layer-by-layer by the irradiation of the radiation source on this covering surface. During the printing process, the polymerizable liquid is automatically filled in the construction zone as the workbench is moved downwards, so that the contact with the covering surface is maintained and thus the profile of the covering surface at the contact between the polymerizable liquid and the covering surface is maintained to carry out a new layer of irradiation and curing without the need of scraping. Therefore, the defects of the traditional "top-down" three-dimensional manufacturing technology, such as the fluctuations in the liquid level, mechanical complexity, low speed, and incapability of continuous printing, are overcome.

2. The present invention further adopts a cover plate that is permeable to the polymerization inhibitor thereby forming an inhibited curing layer between the covering surface and the polymerizable liquid, or the covering surface are materials or elements that are non-adhesive or less adhesive to the cured polymerizable liquid. In this way, the easy or non-destructive separation between the cured area and the covering surface can be achieved so as to overcome the problem of deformation of the cured surface during the process of manufacturing.

DETAILED DESCRIPTION

The objects, technical solutions and advantages of the present invention will become more apparent from the following description which is described in further detail by way of embodiments and with reference to the accompanying drawings. However, those skilled in the art should understand that the present invention is not limited to the accompanying drawings and the embodiments below.

Figure 1:
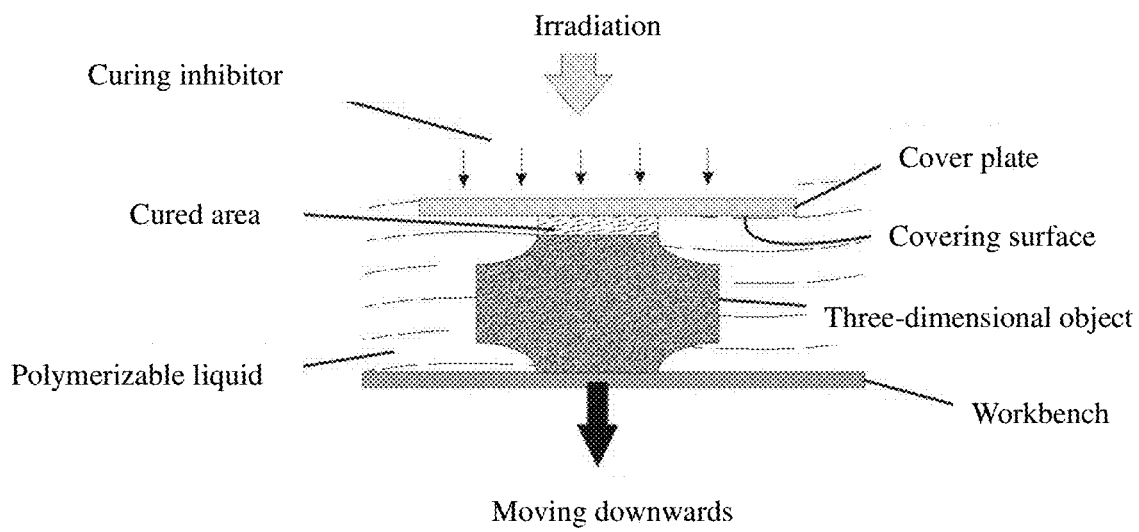
FIG. 1 is a schematic view of the method according to the present invention.

The present disclosure provides a 3D printing method, as shown in FIG. 1. The method is directed to a polymerizable liquid, which is irradiated with a radiation source such as visible light or ultraviolet light to trigger the curing of the polymerizable liquid to produce a three-dimensional object. The method is implemented using a radiation source in a manner of "top down", comprising the following steps:

(a) providing a workbench and a cover plate, wherein the cover plate is an element transparent to a radiation source with a covering surface, and a construction zone of a three-dimensional object is defined between the workbench and the covering surface, irradiation of the construction zone by the energy of the radiation source which permeates through the cover plate; the term "transparent to a radiation source" here means the energy of the radiation source can permeate so that when the radiation source is the light source, the cover plate is an optically transparent element; the radiation source is preferably a digital light processing system (DLP), a digital micro-mirror device (DMD) or a combination of laser and scanning galvanometer;

(b) filling the construction zone with a polymerizable liquid in liquid state and keeping the polymerizable liquid in contact with the covering surface;

(c) irradiation of the construction zone by the energy of the radiation source which penetrates through the cover plate so as to form a cured area;

(d) moving the workbench downwards while keeping the covering surface stationary or substantially stationary, so as to separate the cured area from the covering surface and form a subsequent construction zone between the cured area and the covering surface; then filling the subsequent construction zone with the polymerizable liquid and maintaining the polymerizable liquid in contact with the covering surface and the cured area;

(e) repeat steps (c) and (d), so as to form a new cured area in the subsequent construction zone, which is deposited and adhered onto the previous cured area, the height of the three-dimensional object being constructed gradually increasing until the three-dimensional object is formed.

The workbench may move continuously downwards, and the corresponding irradiation steps are continuous and uninterrupted, wherein the steps (c) and (d) have to be performed at the same time.

The workbench may also move discontinuously downwards, and the corresponding irradiation steps are discontinuous, that is, when each layer moves downwards, the next curing step should wait for a certain period of time and is not carried out until the polymerizable liquid completely fills the subsequent construction zone and is stable. That is, the steps (c) and (d) are carried out in order and there is a certain time interval between these steps.

Figure 2:
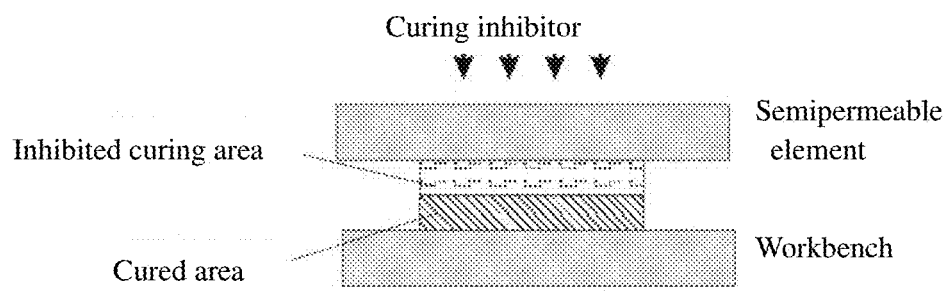
FIG. 2 is a schematic view of an embodiment of the cover plate according to the present invention.

Further, in order to ensure the easy or non-destructive separation between the cured area and the covering surface, a polymerization inhibitor may be used to inhibit the curing of the polymerizable liquid which is in contact with the covering surface, as shown in FIG. 2. The cover plate is a semipermeable element, thus the polymerization inhibitor can permeate onto the covering surface through the semipermeable element. The polymerization inhibitor inhibits the curing of the polymerizable liquid and an inhibited curing layer composed of the polymerizable liquid is formed below the covering surface so as to ensure the easy or non-destructive separation between the cured area and the covering surface. The inhibited curing layer and the cured area are shown in FIG. 2.

To achieve the above objective, the semipermeable element is required to have the properties of being transparent to the radiation source and permeable to the inhibitor. Therefore, the semipermeable element may consist of a nuclear pore membrane element, a microporous quartz crystal element, a microporous mica element, or combinations thereof, or has an oxygen permeability of no less than 10 bar (1 bar=$10^{-10}$ cm$^3$·cm/(cm$^2$·s·cmHg)). Among others, the nuclear pore membrane has a uniform pore diameter and a high air permeability, and is a preferred material for constituting a semipermeable element. Due to the flexible nature of certain semipermeable element, rigid support elements may be provided outside or inside the semipermeable element for increasing the rigidity of the semipermeable element. For example, the support elements may stretch, flatten or fasten the semipermeable element to increase the rigidity of the semipermeable element. The support element may completely or partially enclose the semipermeable element in such a way that the support element allows the energy of the radiation source to pass through when it is positioned in the irradiation path of the radiation source and allows the polymerization inhibitor to pass through when it is positioned in the permeation path of the polymerization inhibitor. The nuclear pore membrane may be made of the following materials by nuclear track etching including but not limited to: polycarbonate (PC), polyethylene terephthalate (PET), polyimide (PI), polyethylene (PE) or polypropylene (PP). The nuclear pore membrane element typically has a pore density of $10^7$-$10^{11}$/cm$^2$, and/or a pore diameter of 0.01 μm-5 μm, and a gas permeability of no less than 100 bar. Preferably, the semipermeable element has a pore density of $10^8$-$10^{10}$/cm$^2$, and/or has a pore diameter of 0.02 μm-0.2 μm. The microporous quartz crystal element and the microporous mica element can be obtained by way of nuclear track etching, photolithography, or ion etching. Due to the anisotropic characteristics of the crystals, uniform columnar pores can be obtained in a specific direction.

In order to ensure the easy or non-destructive separation between the cured area and the covering surface, the inhibited curing layer should have a thickness of no less than 5 μm; and the inhibited curing layer should also be maintained for a certain period of time which is at least no less than the duration the curing process lasts.

The polymerizable liquid may include monomers, particularly free-radical polymerizable monomers (in this case, the corresponding curing inhibitor is air, pure oxygen, or oxygen-enriched gas mixture, and oxygen enrichment is generally considered to be greater than 21% oxygen content), and suitable initiators such as free radical initiators, and combinations thereof. The specific polymerizable liquids include: (meth)acrylic acids, acrylamides, styrenes, olefins, halogenated olefins, cyclic olefins, maleic anhydride, functionalized oligomers, multifunctional curing site monomers, functionalized PEGs and the like, including combinations thereof. Examples of liquid resins, monomers, and initiators include, but are not limited to: U.S. Pat. Nos. 8,232,043; 8,119,214; 7,935,476; 7,767,728; 7,649,029; WO 2012129968A1; CN 102715751A; JP 2012210408A, of which the contents disclosed are incorporated herein by reference in their entirety.

If the polymerizable liquid contains a free radical polymerizable resin, the corresponding curing inhibitor is oxygen. The curing inhibitor used for the free radical polymerizable resin is, for example, air, pure oxygen, oxygen-enriched gas. It is also possible to increase the pressure of the curing inhibitor to increase the permeability of the curing inhibitor.

Figure 3:
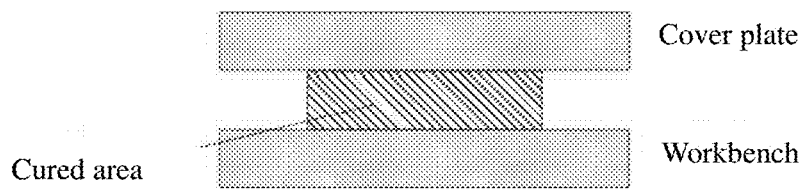
FIG. 3 is a schematic view of another embodiment of the cover plate according to the present invention.

In addition, in order to ensure the easy or non-destructive separation between the cured area and the covering surface, it is also possible to use elements or materials that are non-adhesive or less adhesive to the cured polymerizable liquid on the covering surface when the workbench is pulling down, as shown in FIG. 3. Therefore in the process of constructing a three-dimensional object, the cured area can be easily separated from the covering surface when the workbench is pulled downwards. With the use of this kind of non-adhesive element, additional curing inhibitor is no longer necessary, and with the use of less adhesive element, the curing inhibitors may or may not be used. These non-adhesive or less adhesive elements are, for example, Teflon elements, silicone elements, polydimethylsiloxane elements, poly-fluorinated ethylene propylene elements, or combinations thereof. The non-adhesive or less adhesive element has a thickness of 0.01 mm to 100 mm, for example a thickness of 1 mm to 10 mm.

Figure 4:
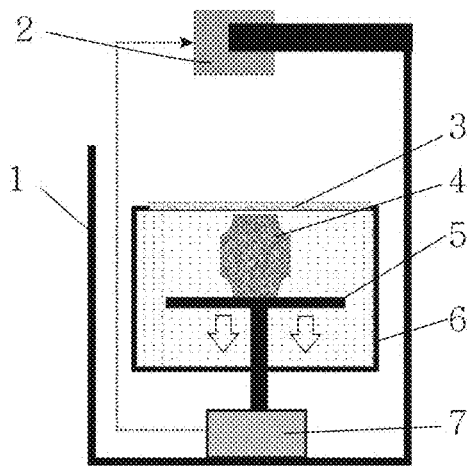
FIG. 4 is a schematic view of a first embodiment of the apparatus according to the present invention.

The present invention also provides an apparatus for manufacturing a three-dimensional object using a polymerizable liquid. FIG. 4 shows a first embodiment of the apparatus. The apparatus includes the following main components: a main structure 1, a radiation source 2, a cover plate 3, a three-dimensional object 4, a workbench 5, a liquid tank 6 and a control unit 7.

The main structure 1 constitutes a basic frame structure of the apparatus for fixing and connecting other components.

The radiation source 2 irradiates the construction zone through the cover plate to initiate the curing of the polymerizable liquid. Preferably the radiation source 2 is a digital light processing system (DLP), a digital micro-mirror device (DMD) or a combination of a laser and a scanning galvanometer.

The cover plate 3 has a covering surface. The cover plate 3 is a component that is fixed or substantially fixed and transparent to the radiation source during the implementation of the curing reaction, and the energy for initiating the curing of the polymerizable liquid can be irradiated onto the covering surface through the cover plate. Here, the covering surface is completely or almost completely in contact with the polymerizable liquid.

The cover plate 3 may be the top or a part of the top of the liquid tank 6, or may be larger than the upper opening portion of the liquid tank 6. The cover plate 3 and the liquid tank 6 may constitute a closed container, and may also constitute a container with an opening. In the present embodiment, the cover plate 3, as the top of the liquid tank 6, forms a closed container with the liquid tank 6. Since the cover plate 3 is fixed during the curing process, the volume of the closed container thus constituted is constant. The lower surface of the cover plate 3 is the covering surface. When the closed container is filled with the polymerizable liquid, the covering surface is in contact with the polymerizable liquid.

The workbench 5, which is used for supporting the constructed three-dimensional object, is connected with a electric platform. The motor in the electric platform drives the workbench 5 to move up and down under the control of the control unit 7. The construction zone of the three-dimensional object is delimited between the workbench 5 and the covering surface, and the distance from the top surface of the workbench to the covering surface is the height of individual layers of the three-dimensional object. When the curing reaction is carried out, the workbench 5 moves downwards, the speed and/or the period of its downward movement is adjusted by the control unit 7 as the case may be.

The liquid tank 6 is used to contain the polymerizable liquid. When the curing reaction is carried out, the polymerizable liquid will be filled in the liquid tank 6 until the polymerizable liquid fills the entire closed container composed of the cover plate 3 and the liquid tank 6, and the polymerizable liquid is completely or almost completely in contact with the covering surface and ensures that there are no air bubbles or voids in the closed container. During the curing process, the polymerizable liquid will flow into and fill the clearance left caused by the fact that workbench 5 is far away from the covering the surface, so as to maintain the contact with the covering surface. Therefore, the profile of the covering surface at the contact between the polymerizable liquid and the covering surface is maintained without introducing bubbles or voids.

The control unit 7 is used to drive the workbench 5 to move and control the intensity and shape of the irradiation of the radiation source 2.

In addition, the cover plate 3 and the liquid tank 6 may also constitute a container with an opening, which facilitates the real-time replenishment of the polymerizable liquid from the opening. Since the cover plate 3 is fixed during the curing process, the volume of the container thus constructed does not change. The rest is consistent with the description of FIG. 4 and will not be described again.

Further, in order to ensure the non-destructive separation between the cured area and the covering surface, the cover plate is a semipermeable element, the upper surface of which is contact with the polymerizable fluid, thus the polymerization inhibitor can penetrate onto the covering surface through the semipermeable element. The polymerization inhibitor inhibits the curing of the polymerizable liquid and an inhibited curing layer composed of the polymerizable liquid is formed below the covering surface so as to ensure the easy or non-destructive separation between the cured area and the covering surface, as shown in FIG. 2, wherein the covering surface is partially contact with the polymerizable liquid. In order to increase the permeability of the polymerization inhibitor fluid, it is possible to use a compressed gas cylinder or an air pump to pressurize the container supplying the polymerization inhibitor, thereby improving the permeation effect of the fluid.

Alternatively, in order to ensure the non-destructive separation between the cured area and the covering surface, materials or elements that are non-adhesive or less adhesive to the cured polymerizable liquid may be used on the covering surface of the cover plate, so that the cured area can be separated from the covering surface without damage, as shown in FIG. 3. With the use of this kind of non-adhesive materials or elements, additional curing inhibitor is no longer necessary, and with the use of less adhesive materials or elements, the curing inhibitors may be used to enhance the effects, or may not be used.

Figure 5:
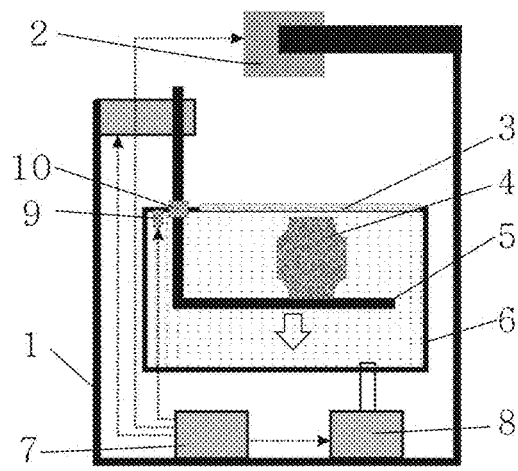
FIG. 5 is a schematic view of a second embodiment of the apparatus according to the present invention.

FIG. 5 shows a second embodiment of the apparatus. The difference between the present embodiment and the apparatus in the first embodiment is that the apparatus of this embodiment further includes a liquid pump 8 and a pressure detector 9. The pressure detector 9 is used to detect the pressure change in the closed container. The control unit 7 drives the liquid pump 8 to pump the polymerizable liquid according to the pressure change detected by the pressure detector 9 so as to maintain the pressure in the closed container. When the pressure change detected by the pressure detector 9 is greater than the set threshold value, the control unit 7 drives the liquid pump 8 to pump part of the polymerizable liquid in the closed container; when the pressure change detected by the pressure detector 9 is less than the set threshold value, the control unit drives the liquid pump 8 feeds part of the polymerizable liquid into the closed container. The apparatus of the present embodiment can effectively solve the problem of significant volume change of the polymerizable liquid during the curing process.

In order to improve the tightness of the container, sealing rings 10 may be provided where individual components (such as the workbench 5, the liquid pump 8, the cover plate 3) and the liquid tank 6 are fastened. It is only shown in FIG. 5 that the sealing ring is provided where the workbench 5 and the liquid tank 6 are fastened.

The rest is the same as that of the first embodiment, and will not be described again.

Figure 6:
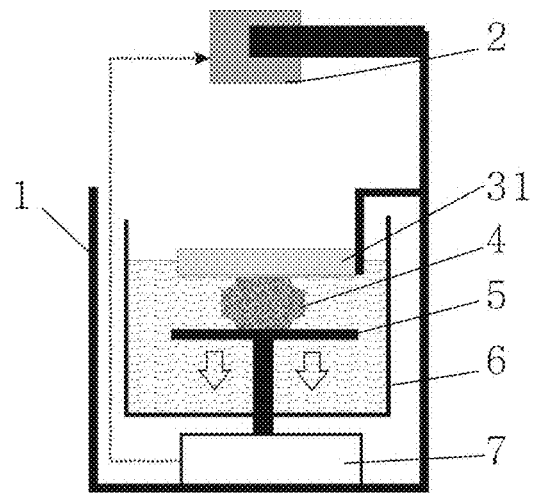
FIG. 6 is a schematic view of a third embodiment of the apparatus according to the present invention.

FIG. 6 shows a third embodiment of the apparatus. The apparatus includes the following main components: a main structure 1, a radiation source 2, a cover plate 31, a three-dimensional object 4, a workbench 5, a liquid tank 6 and a control unit 7.

The main structure 1 constitutes a basic frame structure of the apparatus for fixing and connecting other components.

The radiation source 2 is used to irradiate the construction zone through the cover plate to initiate the curing of the polymerizable liquid. Preferably the radiation source 2 is a digital light processing system (DLP), a digital micro-mirror device (DMD) or a combination of a laser and a scanning galvanometer.

The cover plate 31 has a covering surface. The cover plate 31 is an element that is fixed or substantially fixed and transparent to the radiation source during the implementation of the curing reaction, and the energy for initiating the curing of the polymerizable liquid can be irradiated onto the covering surface through the cover plate.

In the present embodiment, the cover plate 31 is fixed on the main structure and is located in the liquid tank 6. Of course, the cover plate may also be fixed on the liquid tank 6. The liquid tank 6 is filled with sufficient polymerizable liquid so that the covering surface is below the liquid level of the polymerizable liquid. Therefore, the polymerizable liquid will exert a certain pressure on the covering surface, thereby increasing the flow rate of the polymerizable liquid so that the subsequent construction zone can be filled up quickly during the downward movement of the workbench 5.

The workbench 5, which is used to support the constructed three-dimensional object, is connected with the electric platform which can move up and down under the control of the control unit 7. The construction zone of the three-dimensional object is delimited between the workbench 5 and the covering surface, and the distance from the top surface of the workbench to the covering surface is the height of the three-dimensional object. When the curing reaction is carried out, the workbench 5 moves downwards, the speed and/or the period of its downward movement is adjusted by the control unit 7 as the case may be.

The liquid tank 6 is used to contain the polymerizable liquid. Before the curing reaction is carried out, the polymerizable liquid should be filled into the liquid tank 6 until the liquid level is not lower than the covering surface. During the implementation of the curing process, the polymerizable liquid fills the construction zone. In the present embodiment, the liquid tank 6 may have an opening structure. When the volume of the polymerizable liquid changes significantly during the process of curing, the liquid may be refilled.

The control unit 7 is used to drive the workbench 5 to move and control the intensity and shape of the irradiation of the radiation source 2.

In order to improve the tightness of the liquid tank 6, sealing rings may be provided where individual components (such as the workbench 5) and the liquid tank 6 are fastened.

In addition, in order to ensure non-destructive separation between the cured area and the covering surface, the first embodiment may be used, and will not be repeated here.

The embodiments of the present invention have been described above. However, the present invention is not limited to the above-described embodiments. Any modification, equivalent alternation and development made within the scope and principle of the present disclosure fall within the protection scope of the present disclosure.

The invention claimed is:

1. A 3D printing apparatus, comprising:
a radiation source, a workbench and a liquid tank, a workbench for supporting a constructed three-dimensional object, and a liquid tank for containing a polymerizable liquid for constructing the three-dimensional object, wherein the apparatus also includes a cover plate wherein the cover plate is located in the liquid tank or on a top of the liquid tank such that the cover plate is fixed during the printing process and the liquid tank is a closed container; the radiation source irradiates from above the cover plate which is an element transparent to the radiation source; and a lower surface of the cover plate is a covering surface which remains in contact with the polymerizable liquid during the printing process, wherein the cover plate is a semipermeable element, and a polymerization inhibitor can permeate onto the covering surface through the semipermeable element; an inhibited curing layer is formed on the covering surface wherein the polymerization inhibitor is used to inhibit the curing of the polymerizable liquid, so as to ensure the non-destructive separation between the cured area and the covering surface during the printing process.

2. The 3D printing apparatus according to claim 1, wherein the semipermeable element is a semipermeable polymer, porous glass, a nuclear pore membrane element, a microporous quartz crystal element, a microporous mica element, or combinations thereof; or the semipermeable element has an oxygen permeability of no less than 10 bar.

3. The 3D printing apparatus according to claim 1, wherein the inhibited curing layer has a thickness of no less than 5 μm; or the inhibited curing layer should also be maintained for a certain period of time, which is at least no less than the duration the curing process lasts.

4. The 3D printing apparatus according to claim 1, wherein rigid support elements are provided outside or inside the semipermeable element for increasing the rigidity of the semipermeable element.

5. The 3D printing apparatus according to claim 1, wherein the polymerization inhibitor permeates the semipermeable element naturally or under pressure.

6. The 3D printing apparatus according to claim 1, wherein the covering surface of the cover plate uses materials or elements that are non-adhesive or less adhesive to the cured polymerizable liquid, so that the cured area and the covering plate are able to be separated non-destructively during the printing process.

7. The 3D printing apparatus according to claim 6, wherein the non-adhesive or less adhesive materials or elements are selected from Teflon materials or elements, silicone materials or elements, polydimethylsiloxane materials or elements, polyfluorinated ethylene propylene materials or elements, or combinations thereof.

8. The 3D printing apparatus according to claim 1, wherein the polymerizable liquid contains free radical polymerizable resin and the inhibited curing layer is air, pure oxygen and oxygen-enriched gas.

9. The 3D printing apparatus according to claim 1, wherein when the cover plate and the liquid tank constitute a closed container, the apparatus further includes a liquid pump, a pressure detector and a control unit, wherein the pressure detector is used to detect the pressure change in the closed container, and wherein the control unit drives the liquid pump to pump the polymerizable liquid according to the pressure change detected by the pressure detector so as to maintain the pressure in the closed container.

10. The 3D printing apparatus according to claim 1, wherein the apparatus also includes a motor and a control unit, wherein the motor drives the workbench to move up and down under the control of the control unit.

11. The 3D printing apparatus according to claim 1, wherein sealing rings are provided where the liquid tank is fastened to one or more of the workbench and cover plate.

* * * * *